United States Patent [19]

Büchel et al.

[11] 3,934,026
[45] Jan. 20, 1976

[54] COMBATING NEMATODES WITH ALKANESULFONIC ACID 2-BROMOETHYL ESTERS

[75] Inventors: Karl Heinz Büchel, Wuppertal; Bernhard Homeyer, Opladen, both of Germany

[73] Assignee: Bayer Aktiengesellschaft, Leverkusen, Germany

[22] Filed: Nov. 5, 1974

[21] Appl. No.: 521,117

[30] Foreign Application Priority Data
Nov. 21, 1973  Germany............... 2358017

[52] U.S. Cl. .................... 424/303; 424/303
[51] Int. Cl.² .......................... A01N 9/14
[58] Field of Search .................... 424/303

[56] References Cited
FOREIGN PATENTS OR APPLICATIONS
2,141,586  3/1972  Germany

OTHER PUBLICATIONS

Chemical Abstracts 72:13290c (1970).

J. of Economic Entomology, Labrecque et al. Vol. 63, No. 5, pp. 1716–1717.

*Primary Examiner*—Leonard Schenkman
*Attorney, Agent, or Firm*—Burgess, Dinklage & Sprung

[57] ABSTRACT

Nematodes are combated by applying to them or their habitat an alkanesulfonic acid 2-bromoethyl ester of the formula $$R-SO_2-O-CH_2-CH_2-Br$$

in which
R is a straight or branched alkyl radical with 1 to 5 carbon atoms.

7 Claims, No Drawings

COMBATING NEMATODES WITH ALKANESULFONIC ACID 2-BROMOETHYL ESTERS

The present invention relates to and has for its objects the combating of nematodes with alkanesulfonic acid 2-bromoethyl esters, with other and further objects becoming apparent from a study of the within specification and accompanying examples.

Alkanesulfonic acid 2-bromoethyl esters and their use as larvicides are known from U.S. Dept. Agr. Res. Serv. 33–87 (1963) 8 pp. Their use as an antidote in herbicidal agents is also known from German Published Specification DOS 2,141,586.

It has already been disclosed in German Published Specification DAS 1,243,677, in Z. Obsc. Khim. 33 (1963) No. 1, pages 35 – 38 and in French Pat. No. 1,534,046 that certain alkanesulfonic acid esters, especially methane-sulfonic (Compound A) and ethanesulfonic acid 2-chloroethyl ester (Compound B), exhibit pesticidal, for example, acaricidal, insecticidal and/or fungicidal, properties. The action of these compounds as nematocides is, however, not satisfactory, especially if low amounts are used.

The present invention provides a method of combating nematodes which comprises applying to the nematodes or a habitat thereof an alkanesulfonic acid 2-bromoethyl ester of the general formula

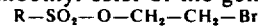

in which
R is a straight or branched alkyl radical with 1 to 5 carbon atoms,
alone or in admixture with a diluent or carrier.

Surprisingly, the alkanesulfonic acid 2-bromoethyl esters used according to the invention exhibit a substantially higher nematocidal action than the alkanesulfonic acid esters previously known, which are chemically the nearest active compounds of similar type of action. It should be emphasized that the alkanesulfonic acid 2-bromoethyl esters used according to the invention exhibit an excellent nematocidal action even if low amounts are used. The new use of these alkanesulfonic acid 2-bromoethyl esters thus represents an enrichment of the art.

In the general formula (I) R is preferably methyl, ethyl, n-propyl, iso-propyl or n-pentyl. The following may therefore be mentioned as examples of the active compounds used according to the invention:

methanesulfonic acid 2-bromoethyl ester, ethanesulfonic acid 2-bromoethyl ester, n-propane-sulfonic acid 2-bromoethyl ester, iso-propanesulfonic acid 2-bromoethyl ester, and n-pentanesulfonic acid 2-bromoethyl ester.

The alkanesulfonic acid 2-bromoethyl esters are prepared, for example, by reacting 2-bromoethanol with alkanesulfochlorides in the presence of a diluent, such as diethyl ether, and optionally of an acid acceptor, such as triethylamine, at a temperature of 0° to 5°C. The reaction products may be isolated by pouring the solution or suspension into water after completion of the reaction, separating off the organic phase and filtering and concentrating it after drying.

The active compounds according to the invention couple low toxicity to warm-blooded animals with strong nematocidal properties and can therefore be used for combating nematodes, especially phytopathogenic nematodes. These essentially include leaf nematodes (Aphelenchoides), such as the chrysanthemum eelworm (A. ritzemabosi), the leaf-blotch eelworm (A. fragariae), and the rice eelworm (A. oryzae); stem nematodes (Ditylenchus), such as the stem eelworm (D. Dipsaci); root-knot nematodes (Meloidogyne), such as M.arenaria and M.incognita; cyst-forming nematodes (Heterodera), such as the potato cyst eelworm (H. rostochiensis) and the beet cyst eelworm (H. schachtii); and non-parasitic root nematodes, for example of the genera Pratylenchus, Paratylenchus, Rotylenchus, Xiphinema and Radopholus.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other nematocides, or insecticides, acaricides, fungicides, bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g., average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

When used against nematodes, the preparations are generally applied to an area of agriculture in amounts of 1 to 100 kg of active compound per hectare, and are then incorporated into the soil.

Furthermore, the present invention contemplates methods of selectively killing, combating or controlling nematodes, which comprises applying to at least one of correspondingly (a) such nematodes, and (b) the corresponding habitat thereof, i.e. the locus to be protected, e.g. to a growing crop or to an area where a crop is to be grown, a correspondingly combative or toxic amount, i.e. a nematocidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

1. $CH_3-SO_2-O-CH_2-CH_2-Br$ 106 g (1.05 moles) of triethylamine were added dropwise to a solution of 125 g (1 mole) of 2-bromoethanol and 114.5 g (1 mole) of methanesulfochloride in 1 liter of absolute ether while stirring at 0°C, and to complete the reaction the mixture was then stirred for a further 2 hours at room temperature. The resulting suspension was poured into approximately 500 ml of water and the organic phase was separated off and again extracted by shaking with approximately 300 ml of water. After again separating off the ether phase, the latter was dried over sodium sulfate, filtered and concentrated. 163 g (80% of theory) of methanesulfonic acid 2-bromoethyl ester were obtained in the form of an oil of boiling point 95°C/0.4 mm Hg.

The following compounds were obtained analogously

| Compound | |
|---|---|
| $C_2H_5-SO_2-O-CH_2-CH_2-Br$ | boiling point/ 0.2 mm 92°C |
| $n-C_3H_7-SO_2-O-CH_2-CH_2-Br$ | boiling point/ 0.1 mm 83 – 86°C |
| $HC(CH_3)_2-SO_2-O-CH_2-CH_2-Br$ | boiling point/ 0.1 mm 88 – 92°C |
| $n-C_4H_9-SO_2-O-CH_2-CH_2-Br$ | boiling point/ 0.1 mm 90 – 95°C |
| $n-C_5H_{11}SO_2-O-CH_2-CH_2-Br$ | boiling point/ 0.1 mm 105 – 107°C |

EXAMPLE 2

Critical concentration test

Test nematode: *Meloidogyne incognita*
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration.

The preparation of active compound was intimately mixed with soil which was heavily infested with the test nematodes. The concentration of the active compound in the preparation was of practically no importance; only the amount of active compound per unit volume of soil, which is given in ppm in the table, was decisive. The soil was filled into pots, lettuce was sown in and the pots were kept at a greenhouse temperature of 27°C. After 4 weeks, the lettuce roots were examined for infestation with nematodes, and the degree of effectiveness of the active compound was determined as a percentage. The degree of effectiveness was 100% when infestation was completely avoided; it was 0% when the infestation was exactly the same as in the case of the control plants in untreated soil which had been infested in the same manner.

The active compound, the amounts applied and the results can be seen from the following table:

Table

*Nematocides/Meloidogyne incognita*

| Active compound (structure) | Degree of destruction in % at active compound concentration of | |
| --- | --- | --- |
| | 20 ppm | 10 ppm |
| $CH_3-SO_2-O-CH_2-CH_2Cl$ (known) (A) | 0 | |
| $C_2H_5-SO_2-O-CH_2CH_2Cl$ (known) (B) | 90 | 0 |
| $CH_3SO_2-OCH_2CH_2Br$ | 100 | 100 |
| $C_2H_5SO_2-OCH_2CH_2Br$ | 100 | 100 |
| $n-C_3H_7SO_2-OCH_2CH_2Br$ | 100 | 100 |
| $-C_4H_9SO_2-OCH_2CH_2Br$ | 100 | 100 |
| $n-C_5H_{11}SO_2-OCH_2CH_2Br$ | 100 | 100 |

It will be appreciated that the instant specification and examples are set forth by way of illustration and not limitation, and that various modifications and changes may be made without departing from the spirit and scope of the present invention.

What is claimed is:

1. A method of combating nematodes which comprises applying to the nematodes a nematocidally effective amount of an alkane-sulfonic acid 2-bromoethyl ester of the formula $$R-SO_2-O-CH_2-CH_2-Br$$

in which

R is an alkyl radical with 1 to 5 carbon atoms.

2. A method according to claim 1 in which R is methyl.
3. A method according to claim 1 in which R is ethyl.
4. A method according to claim 1 in which R is n-propyl.
5. A method according to claim 1 in which R is iso-propyl.
6. A method according to claim 1 in which R is n-butyl.
7. A method according to claim 1 in which R is n-pentyl.

UNITED STATES PATENT AND TRADEMARK OFFICE
CERTIFICATE OF CORRECTION

PATENT NO. : 3,934,026
DATED : January 12, 1976
INVENTOR(S) : Karl Heinz Büchel et al It is certified that error appears in the above–identified patent and that said Letters Patent are hereby corrected as shown below:

Page 1, item [30] "Foreign Application Prioirty Data"

add -- April 17, 1974  Germany..... 2418417 --.

Signed and Sealed this eighteenth Day of May 1976

[SEAL]

Attest:

RUTH C. MASON
Attesting Officer

C. MARSHALL DANN
Commissioner of Patents and Trademarks